United States Patent
Klaas

(10) Patent No.: US 10,161,445 B2
(45) Date of Patent: Dec. 25, 2018

(54) BEARING OF A LEVER, WHICH IS PROVIDED WITH A PIVOT ARM, IN RELATION TO A PRESSURE PIECE

(71) Applicant: BPW BERGISCHE ACHSEN KG, Wiehl (DE)

(72) Inventor: Thomas Klaas, Reichshof (DE)

(73) Assignee: BPW BERGISCHE ACHSEN KG, Wiehl (DE)

( * ) Notice: Subject to any disclaimer, the term of this patent is extended or adjusted under 35 U.S.C. 154(b) by 0 days.

(21) Appl. No.: 15/324,795

(22) PCT Filed: Aug. 24, 2015

(86) PCT No.: PCT/DE2015/100350
§ 371 (c)(1),
(2) Date: Jan. 9, 2017

(87) PCT Pub. No.: WO2016/029903
PCT Pub. Date: Mar. 3, 2016

(65) Prior Publication Data
US 2017/0204903 A1    Jul. 20, 2017

(30) Foreign Application Priority Data
Aug. 26, 2014   (DE) ........................ 10 2014 112 241

(51) Int. Cl.
*F16C 19/50*    (2006.01)
*F16C 33/46*    (2006.01)
(Continued)

(52) U.S. Cl.
CPC ........ *F16C 19/502* (2013.01); *F16C 33/4605* (2013.01); *F16D 55/22* (2013.01);
(Continued)

(58) Field of Classification Search
CPC ...... F16C 19/46; F16C 19/463; F16C 19/502; F16C 33/4605; F16C 2361/45;
(Continued)

(56) References Cited

U.S. PATENT DOCUMENTS 5,433,298 A  *  7/1995  Antony ................. F16D 65/183
                                                188/71.8
5,819,884 A  *  10/1998  Giering ................ F16C 19/502
                                                188/71.9

(Continued)

FOREIGN PATENT DOCUMENTS

DE           42 15 200 A1    11/1993
DE    10 2007 024787 A1     11/2008
(Continued)

OTHER PUBLICATIONS

ISR for PCT/DE2015/100350 dated Feb. 29, 2016.

*Primary Examiner* — Phillip A Johnson
(74) *Attorney, Agent, or Firm* — Rhodes IP PLC; Christopher R Rhodes

(57) ABSTRACT

A bearing is described that has a first race on a lever side that is curved in a partially cylindrical manner. The bearing has a second race on a pressure piece side that is curved in a partially cylindrical manner. Rolling elements are present that roll on both the first and second races and are grouped together in a bearing cage. A radial projection, which is fixed in terms of rotation relative to the second race and forms a stop which limits the mobility of the bearing cage in one circumferential direction, is present. A pocket or opening, which is arranged in the first race or extends partially into the first race, is also present.

12 Claims, 5 Drawing Sheets

(51) Int. Cl.
*F16D 55/22* (2006.01)
*F16D 65/56* (2006.01)
*F16D 65/18* (2006.01)
F16D 121/14 (2012.01)
F16D 125/22 (2012.01)

(52) U.S. Cl.
CPC ........... *F16D 65/18* (2013.01); *F16D 65/567* (2013.01); *F16C 2361/45* (2013.01); *F16C 2361/53* (2013.01); *F16D 2121/14* (2013.01); *F16D 2125/22* (2013.01)

(58) Field of Classification Search
CPC .......... F16D 65/14; F16D 65/16; F16D 65/18; F16D 65/183; F16D 65/186
See application file for complete search history.

(56) References Cited

U.S. PATENT DOCUMENTS

| | | | | |
|---|---|---|---|---|
| 7,419,036 | B2* | 9/2008 | Birkeneder | F16C 19/502 188/72.9 |
| 8,313,246 | B2* | 11/2012 | Oishi | F16C 19/26 384/548 |
| 8,403,114 | B2* | 3/2013 | Falter | F16D 65/00 188/71.7 |
| 8,632,256 | B2* | 1/2014 | Katayama | F16C 19/502 384/560 |

FOREIGN PATENT DOCUMENTS

| | | |
|---|---|---|
| DE | 10 2010 006262 A1 | 8/2011 |
| EP | 0 589 206 A1 | 3/1994 |

\* cited by examiner

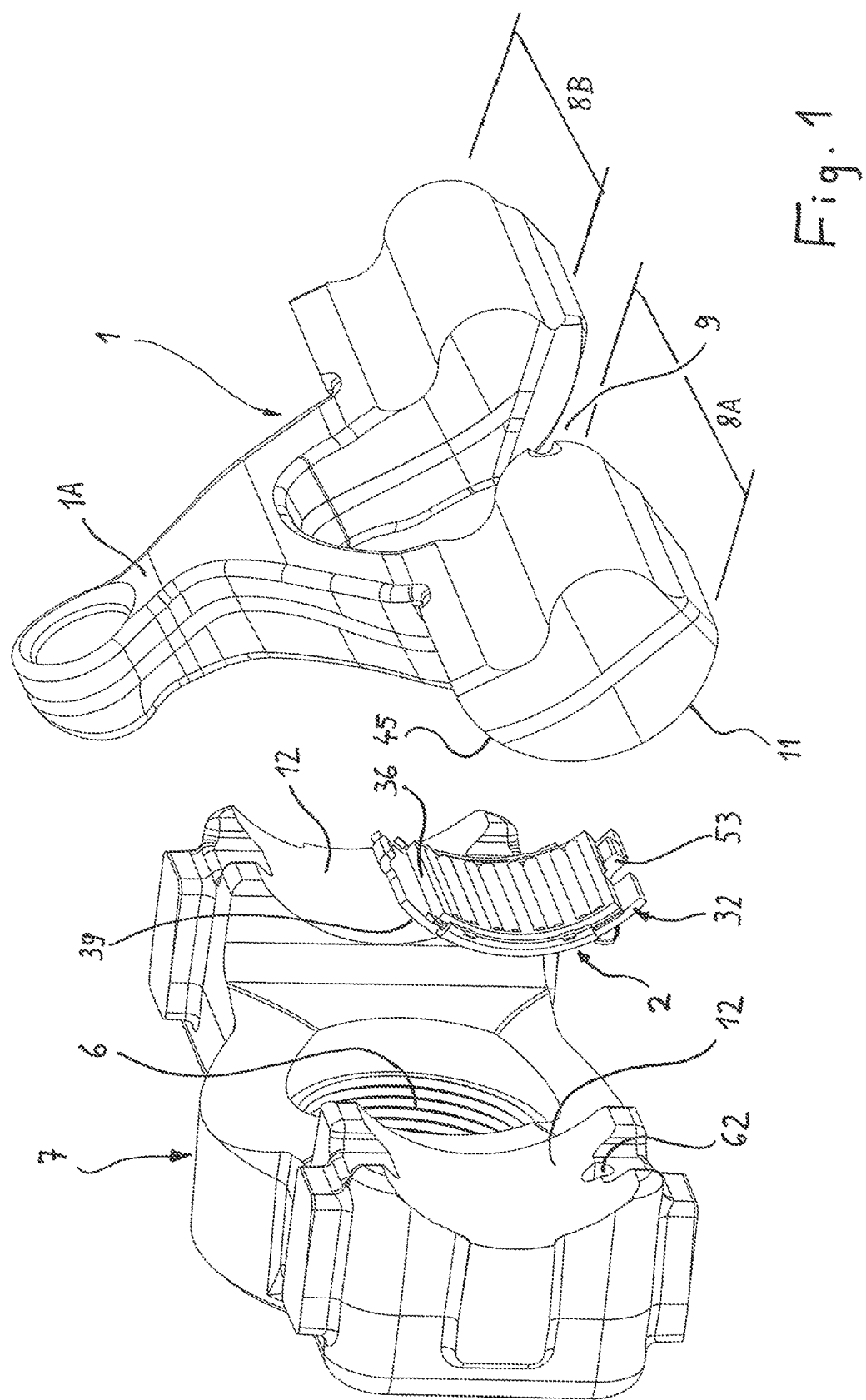

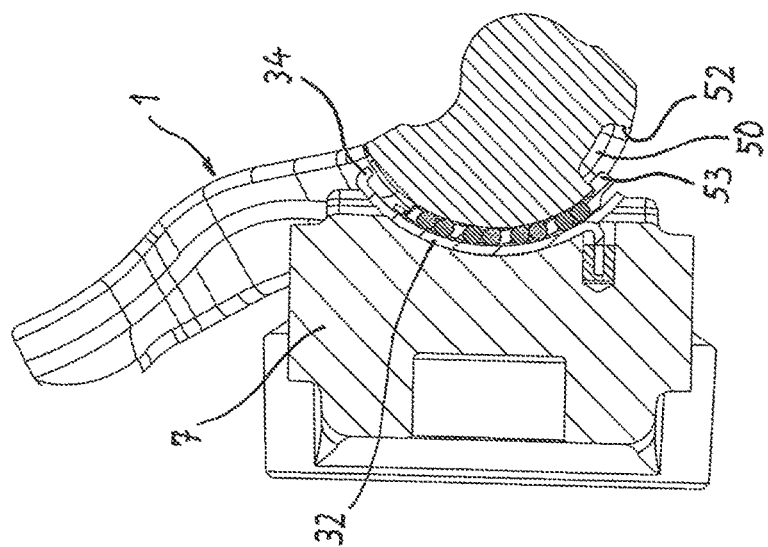
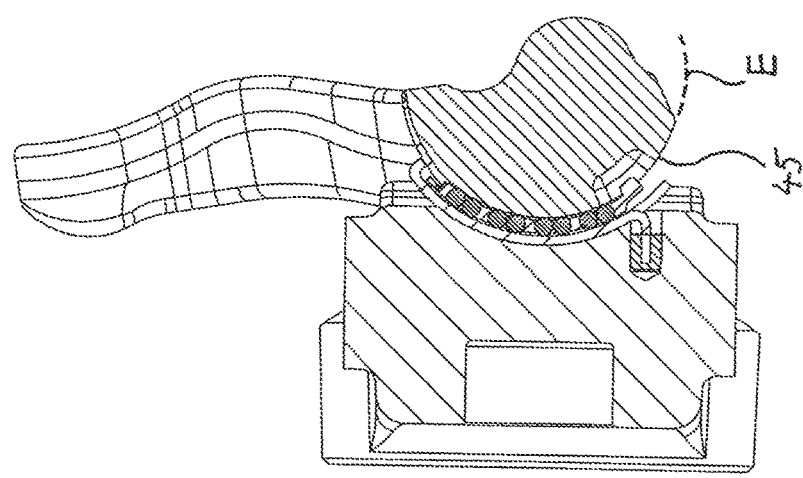
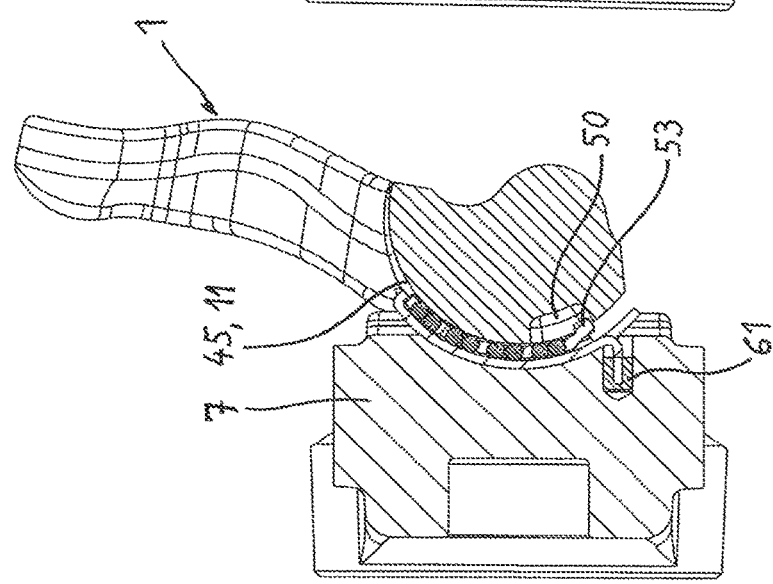

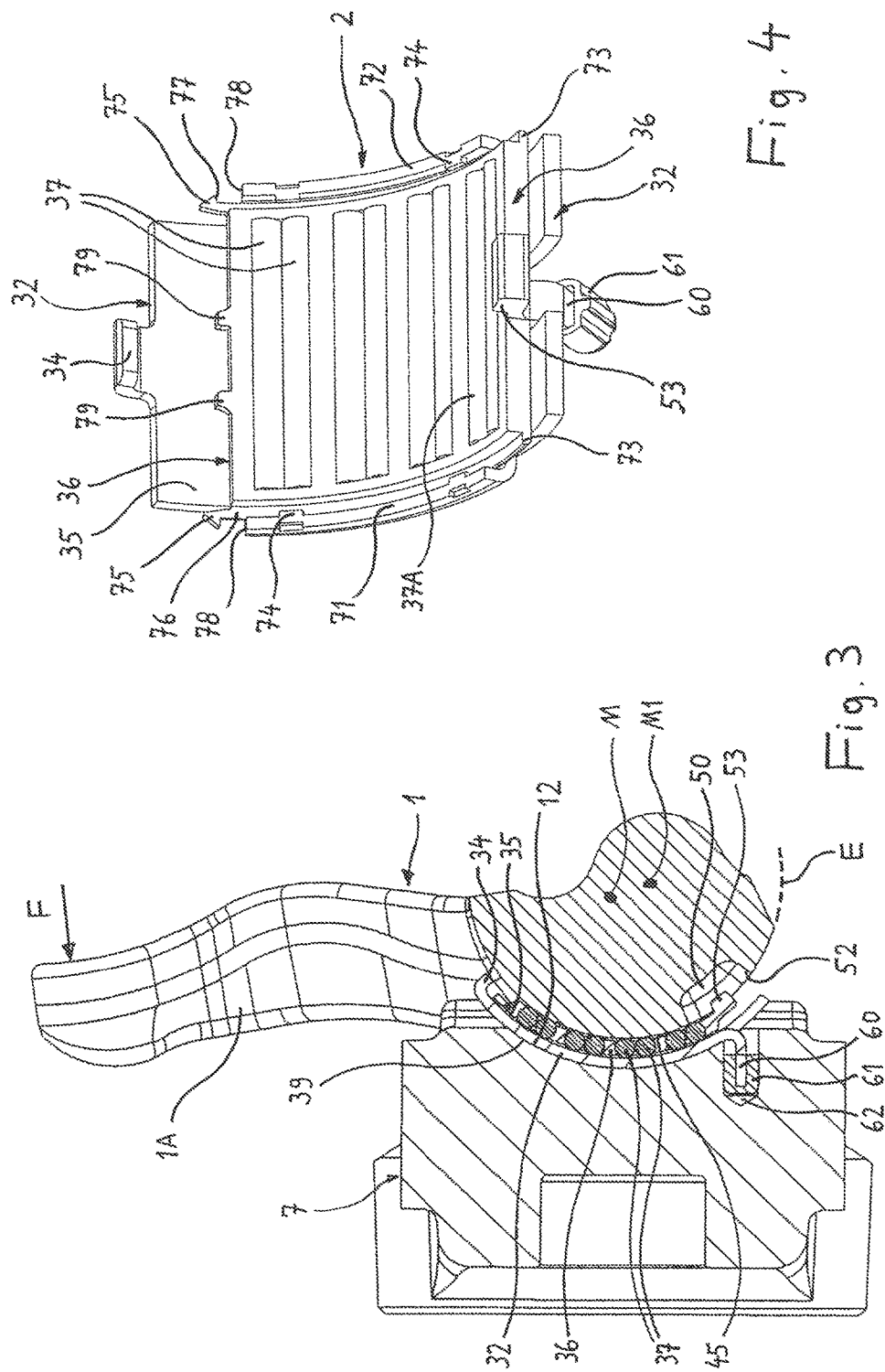

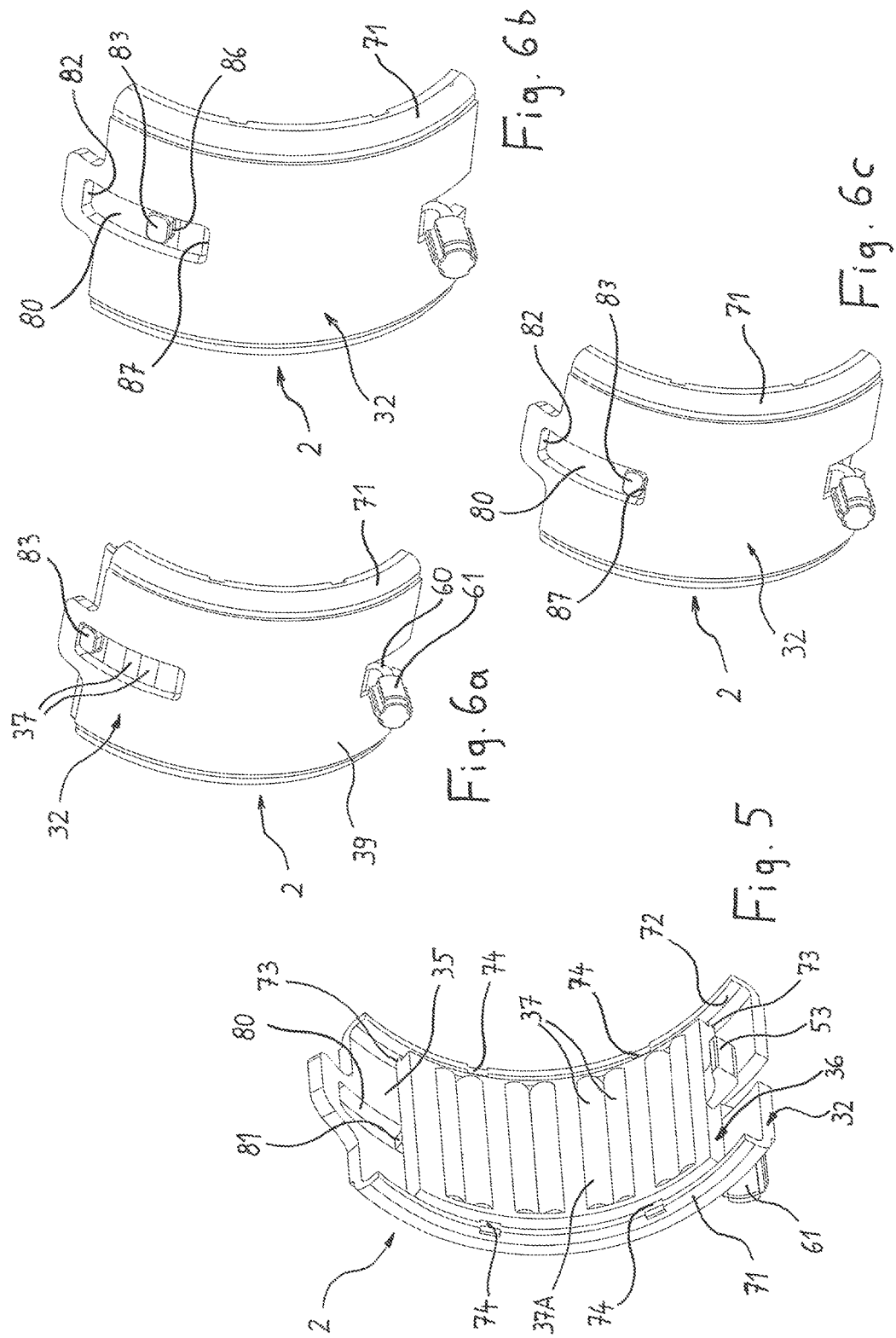

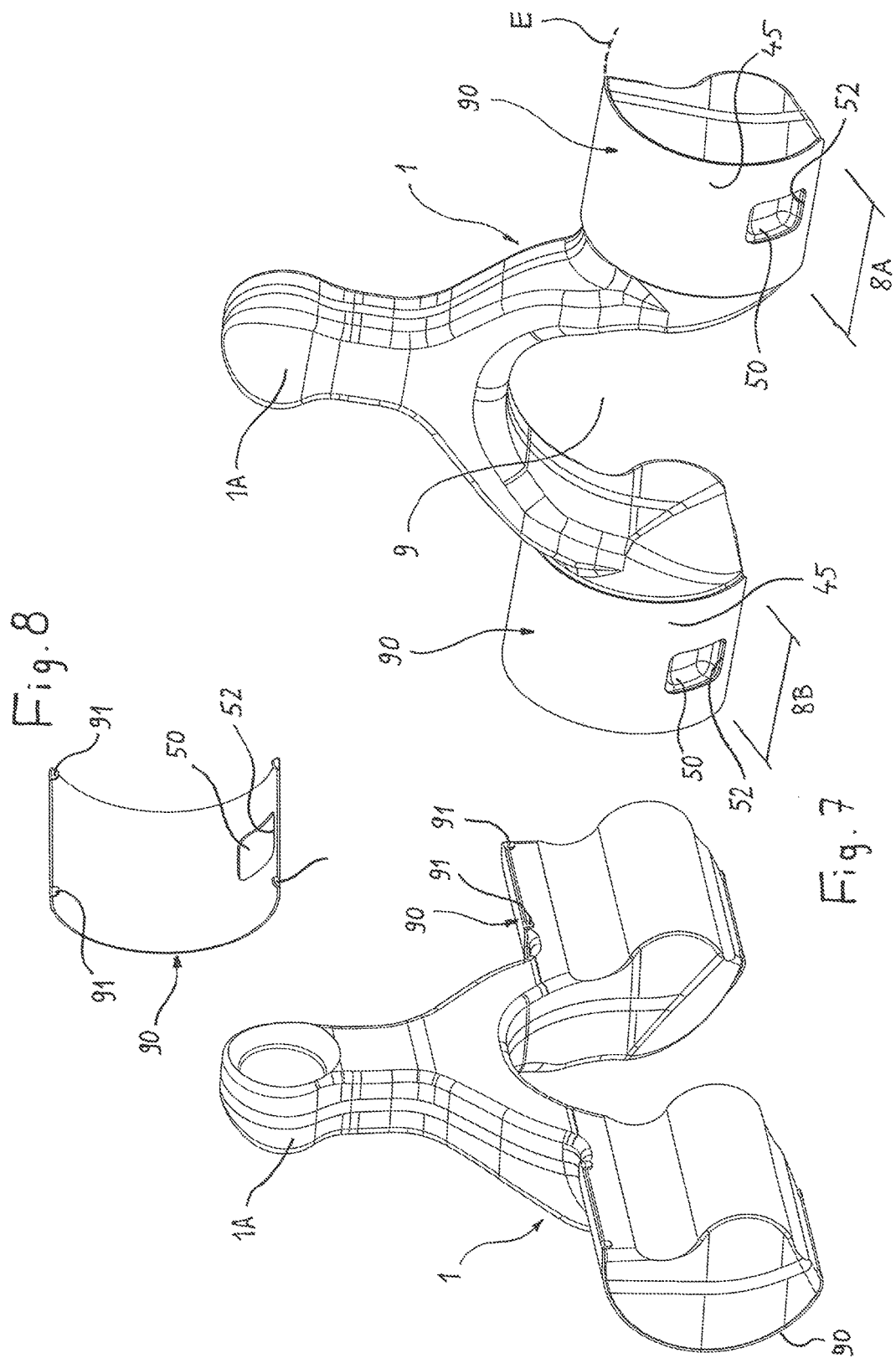

BEARING OF A LEVER, WHICH IS PROVIDED WITH A PIVOT ARM, IN RELATION TO A PRESSURE PIECE

The invention relates to a bearing of a lever, which is provided with a pivot arm, in relation to a pressure piece in accordance with the preamble of patent claim 1.

A bearing having these features is known from DE 10 2005 034 739 A1, DE 10 2007 024 787 A1 or DE 10 2010 006 262 A1. It comprises an inner and an outer bearing shell, the races of which, which are curved in a circular shaped arc, lie radially opposite one another with rolling elements in between. The rolling element space arranged between the races, in which the bearing cage with the rolling elements grouped together therein can move, is delimited in each of the two circumferential directions by a stop. One of the stops is formed as a projection on the outer bearing shell, and the other stop is formed as a projection on the inner bearing shell. Both stops or projections project into the rolling element space, and this has proven disadvantageous in the context of the mounting of the bearing between a lever, which is provided with a pivot arm, and a pressure piece.

It is the underlying object of the invention to refine the assembly aspects of the bearing of the type of lever in question, which is provided with a pivot arm, in relation to a pressure piece.

To achieve this object, a bearing having the features of patent claim 1 is proposed. In this bearing, only the mobility of the bearing cage in one circumferential direction is limited by a projection projecting into the rolling element space. In contrast, the mobility of the bearing cage in the other, second, circumferential direction is limited without a projection extending into the rolling element space.

Instead, the proposal is for a pocket or opening, which is arranged in the other race or extends partially into said race, said pocket or opening extending only over a part of the race width and, at the transition to the curvature plane in which the other race extends, forming a stop edge. This stop edge, which is, as it were, arranged in a recessed manner, serves as a second stop for the bearing cage, this being a particularly advantageous solution in the context of mounting the bearing between a lever, which is provided with a pivot arm, and a pressure piece.

In one embodiment of the bearing, it is proposed that the other race is provided with the pocket or opening on a section of the circumference remote from the pivot arm.

The pocket or opening is preferably arranged in the center of the race width and, furthermore, the width of the pocket or opening should amount to no more than one third of the race width.

In one embodiment, it is proposed that, opposite the stop edge in the circumferential direction, the bearing cage is provided with a projection which projects into the pocket or opening. The projection is preferably formed integrally on the bearing cage, especially if the bearing cage is composed of plastic.

As viewed in the circumferential direction, the length of the projection is preferably less than the length of the pocket or opening. The width of the projection is preferably less than the width of the pocket or opening.

It is furthermore proposed that the race on the pressure-piece side is formed on a bearing shell, on which the radial projection is formed.

To secure it on the pressure piece, the bearing shell can be provided with an outward-projecting anchoring pin, said pin being anchored in the pressure piece.

To achieve low manufacturing costs in the production of the lever, it is advantageous if the pocket or opening is situated in the race on the lever side. In terms of production, it is likewise advantageous if the lever, including the pivot arm, is a forged component, and also if the pocket is the result of the forging process. In this way, the number of processing steps required in the production of the lever can be reduced and hence manufacturing costs saved.

The invention is described below with reference to the drawings, in which:

FIG. 1 shows, in an exploded view, an arrangement comprising a pivotable lever, two rolling bearings, of which only one is shown here, and a pressure piece, said arrangement being used to transfer and multiply the braking force in an air-operated disk brake;

FIGS. 2 *a-c* show a section through the arrangement assembled ready for operation, wherein the respective states as brake application progresses are shown from left to right;

FIG. 3 shows the section according to FIG. 2*b* on an enlarged scale;

FIG. 4 shows the pivot bearing of the bearing in a perspective view, wherein the bearing components of the pivot bearing form a subassembly;

FIG. 5 shows the pivot bearing of the bearing in a second embodiment in perspective view, wherein, once again, the bearing components of the pivot bearing form a subassembly;

FIGS. 6*a-c* show further perspective views of the pivot bearing according to the second embodiment, wherein the respective states as brake application progresses are shown;

FIG. 7 shows the pivotable lever in an embodiment in which bearing shells are additionally mounted on the lever, and FIG. 8 shows one of the bearing shells mounted on the lever according to FIG. 7 in isolation.

FIG. 1 shows an arrangement comprising a pivotable lever 1, two rolling bearings, of which only one rolling bearing 2 is shown in FIG. 1, and a pressure piece 7, said arrangement forming part of an air-operated disk brake for a commercial vehicle and being used to transfer and multiply the braking force. A pressure ram is guided in a brake caliper of the disk brake. When the brake is actuated, the pressure ram, after traversing a release clearance, comes to rest against the rear side of an inner brake pad and presses the latter against the rotating brake disk of the disk brake. At the same time, the reaction force is transmitted on the rear side via the brake caliper to the other brake pad, which acts on the brake disk from the outside.

To compensate for the brake wear which arises in the course of time, the disk brake is provided with an adjusting device. This is situated in an adjusting element provided with an external thread. The external thread of the adjusting element engages in an internal thread 6. The internal thread 6 is situated in a pressure piece 7, which is configured in the manner of a crossmember and is guided in the brake application direction in the brake caliper.

The frictional force between the brake disk and the brake pads and hence the deceleration of the vehicle is dependent on the brake application force produced by a brake cylinder secured on the brake caliper, preferably an air-actuated brake cylinder. The brake cylinder, which is here symbolized only by means of its actuating force F (FIG. 3), acts against the free end of a pivot arm 1A, with which the lever 1 is provided.

Moreover, the lever 1, which can also be referred to as a brake application lever, is of fork-shaped configuration since, although there is only one pivot arm 1A, the brake application shaft of the lever consists of two sections 8A, 8B spaced apart axially. Between these two sections 8A, 8B and arranged on the same center line as the pivot arm 1A is a free space 9. The free space 9 is an extension of the internal thread 6 formed in the pressure piece 7, in which the adjusting element of the adjusting system engages.

The rear side of the two-section brake application shaft of the lever 1 is supported against the brake caliper by means of a pivot bearing (not shown). When the brake cylinder is actuated, the lever 1 pivots about this pivot bearing in the direction of the brake disk. Since, according to FIG. 3, the axis of rotation M of the bearing of the lever 1 on the pressure piece is arranged eccentrically with respect to the axis of rotation M1 of that pivot bearing by means of which the lever 1 is supported against the brake caliper, this pivoting motion leads to the pressure piece 7 being driven forward in the direction of the brake disk.

The support of the lever 1 on the pressure piece 7 is divided between the two sections 8A, 8B of the brake application shaft. On each side of the free space 9 formed centrally in the lever 1 there is therefore in each case one pivot bearing 2, designed as a rolling bearing, for the pivotable support of the lever 1 in relation to the pressure piece 7. For this purpose, the lever 1 is provided with a convexly curved pressure surface 11 on each of the two sections 8A, 8B, facing the pressure piece 7. Each pressure surface 11 is partially cylindrical or partially circular with respect to the axis of rotation M.

In corresponding fashion, the oppositely situated pressure piece 7 has two concavely curved pressure surfaces 12 in the form of shells. The pressure surfaces 12 too are partially cylindrical or partially circular with respect to the axis of rotation M.

Between each of the paired pressure surfaces 11, 12 on the lever 1 and on the pressure piece 7 there is in each case one shell-shaped rolling bearing. The axis of rotation M thereof is offset relative to the axis of rotation M1 of the pivot bearing by means of which the lever 1 is supported on the rear side against the brake caliper to absorb the reaction forces. The eccentricity between the two pivoting axes or axes of rotation M, M1 leads to the pressure surfaces 11 of the lever 1 shifting forward in the direction of the pressure piece 7 as the lever 1 pivots and hence leads to the desired advance and application movement of the pressure piece 7 in the direction of the brake disk.

Each of the two pivot bearings, which are of identical configuration, includes a race 35 on the pressure-piece side, a race 45 on the lever side and, in between, a bearing space curved in the form of a partial circle, in which an individual bearing cage 36 with rolling elements 37 mounted rotatably therein is accommodated. The rolling elements 37 are elongate cylindrical rollers which roll simultaneously on the race 35 on the pressure-piece side and on the race 45 on the lever side and extend over the majority of the width of the bearing cage 36. The bearing cage 36 is preferably composed of plastic.

The race 35 on the pressure-piece side is formed on the concavely configured inner side of a curved bearing shell 32. With its convexly configured outer side 39, the curved bearing shell 32 is supported against the pressure surface 12 on the pressure piece 7. The bearing shell 32 is preferably composed of metal sheet.

A radial projection 34 is formed integrally on the outer bearing shell 32 on the end thereof adjacent to the pivot arm 1A. This projection 34 forms a stop that limits the mobility of the bearing cage 36 in one circumferential direction. The bearing cage 36 together with the rolling elements 37 can therefore move in one circumferential direction only until it strikes against this stop 34. There is therefore no risk that the bearing cage 36 will move so far in this circumferential direction, namely toward the pivot arm 1A, that it and the outer bearing shell 32 fall apart.

The mobility of the bearing cage 36 is also limited by a stop in the other circumferential direction, namely in the direction away from the pivot arm 1A. For this purpose, an opening in the form of a pocket 50 is situated in the race 45 on the lever side, which is convexly shaped and which is produced by grinding sections 8A and 8B of the lever 1. The pocket 50 is a recess in the material of the pressure surface 11 which forms the race 45 on the lever side.

The opening in the form of the pocket 50 is situated in race 45 but extends only over part of the total length of the curved race 45. It also extends only over part of the width of race 45, with the result that areas of the race remain free on both sides of the pocket 50 to allow rolling elements 37 to roll along.

The pocket 50 forms a stop edge 52 where its wall meets the partially cylindrical curvature plane E of race 45. The stop edge 52 forms a stop by limiting the mobility of the bearing cage 36 in the circumferential direction away from the pivot arm 1A.

The counterstop to the stop edge 52 is situated on the bearing cage 36. For this purpose, a projection 53 is formed on one end of the bearing cage 36, opposite the stop edge 52 in the circumferential direction. The projection 53 extends radially inward beyond the partially cylindrical plane E in which race 45 is situated, with the result that the projection 53 extends into the pocket 50.

If the bearing cage 36 is composed of plastic, the projection 53 is formed integrally on the end of the bearing cage.

It can be seen from FIG. 3 that the length of the projection 53 in the circumferential direction is less than the length of the pocket 50 in the circumferential direction. The width of the projection 53 is somewhat less than the width of the pocket 50.

The effect of the two stops limiting the mobility of the bearing cage 36 is shown by FIGS. 2a-2c, since they each show the pivoted lever 1 in a different position. In FIG. 2a, the pivoted lever 1 is in its initial position with the brake unactuated. FIG. 2b shows the lever in a position occupied by the latter when the brake pads come into contact with the brake disk after traversing the release clearance. FIG. 2c shows the lever with maximum brake application and at the full braking force.

The basic positioning of the bearing cage 36 is accomplished in the normal position of the lever according to FIG. 2a. This cage is positioned in such a way between the two stops, i.e. the projection 34 on the bearing shell 32, on the one hand, and the stop edge 52 on the lever 1, on the other hand, that no significant movement is possible for the bearing cage 36. The further the lever 1 pivots as part of brake actuation, the more the cage shifts owing to the rolling of the rolling elements 37 and the more the distances from the two stops increase. The length of the projection 53 should therefore be less in the circumferential direction than the length of the pocket 50 into which the projection 53 projects and in which it can move. In the situation according to FIG. 2c, there is as far as possible no contact between the projection 53 and the wall of the pocket 50, although the figure shows otherwise.

The pocket 50 is situated on the section of the circumference of race 45 which is furthest away from the pivot arm 1A, preferably on the last quarter of the partially cylindrical race 45. This is because, in the situation of maximum brake application force shown in FIG. 2c, the rolling elements 37 grouped together in the bearing cage 36 have traveled so far along the race 45 on the lever side that there is no longer any rolling element 37 on that section of the circumference of race 45 on which the pocket 50 is situated. When the forces are at a maximum, the full width of race 45 is therefore available for support to all the rolling elements 37. At the beginning of brake application, in contrast, as shown in FIG. 2a, some of the rolling elements 37 are still rolling on that section of the circumference of race 45 on which the pocket 50 is situated. Since the pocket is situated in the center of the width of the race, these rolling elements 37 are then supported only in the regions on both sides of the pocket 50, and not in the center. Because the rolling bearing forces are still low in this situation, this is not disadvantageous.

Since the purpose of the pocket 50 is to provide the further stop edge 52 for the bearing cage 36, a narrow width of the pocket 50 is sufficient. The narrower this width, the more width is available as a contact and rolling surface for the rolling elements 37, all of which extend over the full width of race 45. The width of the pocket 50 is preferably no more than one third of the contact width of the rolling elements 37 on race 45.

In the embodiment described here, the pocket 50 is arranged within the area of race 45, i.e. pocket 50 is surrounded on all sides by race 45. Depending on the lever geometry, however, it is also possible, using a pocket 50 which extends only partially into the area of race 45 in the circumferential direction, to obtain the second stop 52 which limits the mobility of the bearing cage 36 in the second circumferential direction. In this case too, the stop edge 52 is situated where the wall of the pocket 50 meets the curvature plane E in which race 45 is situated.

If the lever 1, including the pivot arm 1A thereof, is a component manufactured by forging, the pocket 50 is also the result of the forging process. It is not necessary to subject the pocket 50 and, in particular, the stop edge 52 formed thereon at the transition to the curvature plane E of race 45 to dedicated machining steps if race 45 is machined with high precision, e.g. by grinding the forging in the region of the races 45.

To secure the respective bearing shell 32 on the pressure piece 7, each bearing shell 32 is anchored in the pressure piece 7 by means of an outward-projecting anchoring pin 60. The anchoring pin 60 is of rectangular cross section with two longer sides and two shorter sides and is seated in a substantially likewise rectangular opening in an anchor 61 which, for its part, is seated in a bore 62 (FIG. 1) in the pressure piece 7.

FIG. 4, which applies to each of the two rolling bearings 2, shows the fully assembled shell bearing before it is finally secured on the trough-shaped surface 12 of the pressure piece 7. The two shell bearings are of identical configuration and therefore they cannot accidentally be mixed up.

The bearing shell 32, which is supported against the pressure piece 7, is provided with radially inward-directed side walls 71, 72 on both longitudinal edges. Situated between the side walls 71, 72 is the bearing cage 36, which is therefore guided laterally by the side walls 71, 72. Projections 74 of a width such that the projections 74 extend over longitudinal edges 73 of the bearing cage 36 are formed on both side walls 71, 72, as a result of which the projections 74 lock the bearing cage 36 in the radial direction in the bearing shell 32. The bearing cage 36 therefore cannot come out of the bearing shell 32 radially. The projections 74 are, for example, local deformations of the material of the edges of the side walls 71, 72.

For the compactness of the pivot bearing shown in FIG. 4, it is advantageous that the bearing cage 36 is flatter at its two longitudinal edges 73 than in its central region in which the rolling elements 37 are grouped together. This embodiment allows short side walls 71, 72 on the bearing shell 32, i.e. side walls 71, 72 with a small radial extent.

In particular, the side walls 71, 72 are so short that they extend less far radially than the cylindrical circumferential surfaces 37A (FIG. 4) of the rolling elements 37. As a result, the side walls 71, 72 do not extend as far as the curvature plane E of the race 45 on the lever side when the bearing is fully assembled. The maximum width of race 45 is therefore not subject to any limits, thereby enabling the costs for the production of the lever 1 to be reduced. Another advantage consists in the low requirements on the accuracy of the mutual axial positioning of the bearing shell 32, on the one hand, and of the race 45 on the lever side, on the other hand, and this likewise leads to advantages in terms of assembly and to advantageous costs in production.

To enable the bearing shell and bearing cage to be arranged in a manner which prevents separation in the circumferential direction, this being highly advantageous during the transportation and assembly of the shell bearing, the bearing cage 36 in the embodiment according to FIGS. 1-4 is provided with a retention element 75 on each of its longitudinal edges 73 at its end which is adjacent to the pivot arm 1A after assembly. The retention element 75 is made up of a section 76 extending in the circumferential direction, which is thin and therefore capable of resilient flexibility in the lateral direction and on the end of which there is a locking projection 77. Formed on the locking projection, laterally toward the outside, is a catch nose and an insertion bevel, as a result of which each retention element 75 has the form of a spear tip overall.

At the locking projections 77, the bearing cage 36 is wider than over the rest of its length. If the bearing cage 36 is pushed into the bearing shell 32 in the circumferential direction, the locking projections 77 can yield elastically inward through contact with the insertion bevels and then slide along the inner sides of the side walls 71, 72. Because of their arrangement on the resilient sections 76, the locking projections 77 can spring back behind the ends of the side walls 71, 72. They project laterally outward and, since the overall width of the catch noses is greater than the internal clearance between the two side walls 71, 72, said catch noses can engage behind the ends of the side walls 71, 72 to effect retention.

The bearing cage 36 can then no longer move backward. It is locked in the assembly position shown in FIG. 4 by means of its two retention elements 75. The bearing shell 32 and the bearing cage 36 cannot come apart and can therefore be mounted as a unit on the pressure piece 7 without the need for extra care during this process.

The remaining freedom of movement of the bearing cage 36 is limited by the stop 34 and the stop edges 78 on the ends of the side walls 91, 92. The freedom of movement is made somewhat greater than the maximum rolling movement during a braking operation. Thus, the retention elements 75 have no function in the installed state of the unit consisting of the bearing cage 36 and the bearing shell 32.

Two noses 79 formed on the bearing cage 36 are spaced apart with a spacing corresponding to the width of the stop 34, thus allowing the bearing cage 36 to be pre-positioned during assembly in an initial position relative to the bearing shell 32 by means of frictional engagement between the insides of the noses 79 and the outer surfaces of the stop 34. Here, the frictional engagement is so low that it does not represent a disadvantageous obstacle during operation but is sufficient for fixing up to the point of mounting in the disk brake.

A second embodiment of the pivot bearing 2, which forms a module, is shown in FIGS. 5 and 6a-6c, wherein the same reference signs are used for parts which are the same or have the same action as in the embodiment shown in FIGS. 1-4.

In the second embodiment, the bearing shell 32 is provided with a slotted hole 80 in race 35. As an alternative, a recess in the form of a slotted hole, e.g. a correspondingly designed depression, can be formed in race 35. Extending into the slotted hole 80 or recess in the form of a slotted hole is a projection 83, which is formed integrally on the end of the bearing cage 36. The projection 83 is of a radial length such that it extends beyond race 35 into the slotted hole 80 and into a recess in the form of a slotted hole arranged there.

A stop 81 is formed on the projection 83, facing the pivot arm 1A of the lever 1. With this stop 81, the projection 83 strikes against a stop 82 formed on the bearing shell 32 during a movement of the bearing cage 36 in the direction of the pivot arm 1A. The end of the slotted hole 80 closer to the pivot arm 1A serves as a stop 82.

The projection 83 does not extend radially beyond the convexly curved outer side 39 of the bearing shell 32 in order to ensure that contact between this outer side 39 and the pressure surface 12 of the pressure piece 7 is not impaired.

In principle, it is possible that there is a further stop 86 (FIG. 6b) on the projection 83 and that this further stop 86 delimits the mobility of the bearing cage 36 in the other circumferential direction, i.e. away from the pivot arm 1A. This limitation occurs when the further stop 86 of the projection 83 strikes against the opposite end 87 of the slotted hole 80, as shown in FIG. 6c.

However, the same measures as those in the pivot bearing according to the first embodiment are preferred for limiting the mobility of the bearing cage 36 in this other circumferential direction. In the race 45 on the lever side there is therefore the pocket 50 already described with the stop edge 52. The projection 53 is formed on the bearing cage 36, opposite the stop edge 52 in the circumferential direction (FIG. 5). This projection extends radially inward beyond the partially cylindrical plane E (FIG. 3) in which race 45 is situated and therefore extends right into the pocket 50.

If the bearing cage 36 of the second embodiment is composed of plastic, both the radially outward-directed projection 83 and the radially inward-directed projection 53 are formed integrally on the bearing cage. For this purpose, the bearing cage 36 is composed in the circumferential direction of a main section, in which the rolling elements 37 are arranged, and, toward the ends, of end sections. Projection 83 and projection 53 are each formed integrally on one of these end sections, ensuring that the rolling elements 37 are not obstructed.

Like projection 53, projection 83 and hence also slotted hole 80 are of relatively narrow width. The width of projection 83 is at most one third of the width of the bearing cage 36.

It is advantageous if the width of the slotted hole 80 changes somewhat over its length, wherein the narrowest width is equal to or somewhat less than the width of the projection 83 projecting into the slotted hole 80. This is because it is possible in this way to pre-position the bearing cage 36 by wedging or by frictional engagement relative to the bearing shell 32, e.g. in the position shown in FIG. 6a. The wedging or frictional engagement is so slight that there is no disadvantageous hindrance during operation, whereas the advantage for the pre-positioning of the components of the pivot bearing until they are mounted in the disk brake is great.

Admittedly, the slotted hole 80 leads to a reduction in the area remaining for the outer race 35. However, it should be borne in mind that the slotted hole 80 is situated in that section of the circumference of race 35 which is closest to the pivot arm 1A, preferably in the last quarter of race 35. This is because, in the situation of maximum brake application force shown in FIG. 6c, the rolling elements 37 grouped together in the bearing cage 36 have traveled so far on race 35 that there is no longer any rolling element 37 on that longitudinal section of race 35 on which the slotted hole 80 is arranged. When the forces are at a maximum, the full width of race 35 is therefore available for support to all the rolling elements 37. At the beginning of brake application, in contrast, as shown in FIG. 6a, some of the rolling elements 37 are still rolling on that section of the circumference of race 35 on which the slotted hole 80 is situated. Since the slotted hole is situated in the center of the width of the race, these rolling elements 37 are then supported only on both sides of the slotted hole 80, and not in the center. Because the rolling bearing forces are only low in this situation, this is not disadvantageous.

The insertion of the bearing cage 36 provided with the rolling elements 37 into the surrounding bearing shell 32 can be simplified by the formation of insertion bevels or insertion ramps on projection 83 and/or on the inner side of the bearing shell 32, wherein the bearing cage is retained in the bearing shell 32 once these bevels or ramps have been traversed, with the result that there is then no longer any risk that the parts 36, 32 will fall apart. A brief bending, associated therewith, of the bearing cage and/or of the bearing shell 32 is expected here but is not disadvantageous.

Another embodiment of the lever 1 is shown in FIGS. 7 and 8. As in the embodiments already described, the lever 1, together with the pivot arm 1A thereof, is a forged component, wherein the pocket formed in the lever is also the result of the forging process. However, grinding of the two races 45 is not required in the case of the lever shown in FIG. 7 and FIG. 8 since bearing shells 90 consisting of metal sheet are clipped onto the relevant two sections 8A, 8B of the brake application shaft.

The bearing shells 90 have the same partially cylindrical shape as that achieved by machine grinding of the lever 1 to give the pressure surfaces 11 and races 45 in the embodiments already described. Here, therefore, the partially cylindrical outer side of each bearing shell 90 forms the curvature plane E and the race 45 on the lever side.

The bearing shell 90 consists of deformed and punched metal sheet. At the location where the pocket formed behind it in the lever 1 is situated, it is provided with an opening 50, which is arranged in race 45 or extends partially into the race. The opening 50 extends only over part of the race width and, at the transition to the curvature plane E on the outside, forms the stop edge 52 which limits the mobility of the bearing cage 36 in the circumferential direction. The pocket formed below the opening 50 in the lever 1 is of at least the same width and length as the width and length of the opening 50.

At the edges arranged transversely to the circumferential direction, the bearing shell 90 is provided with bent portions 91. Here, the bent portions are in the form of four fastening tabs 91, which engage behind the lever, thus ensuring that each bearing shell 90 is secured non-rotatably on the brake application section 8A, 8B.

The two bearing shells 90 are of identical configuration. It is therefore impossible for them to be mounted incorrectly by being mixed up.

Each of the two bearing shells 90 is produced from a flat metal sheet and has only inward-bent portions in the form of the fastening tabs 91. To increase the stability of the bearing shell 90, the sides thereof may be bent over, but only inward. Radially toward the outside, on the other hand, each bearing shell 90 is without any elements projecting beyond the partially cylindrical curvature plane E. Apart from its curvature, the outer side of the bearing shell 90, which faces away from the lever 1, is therefore completely level and without projecting or protruding parts.

In an alternative embodiment, the opening 50 is admittedly present in the bearing shells 90 but there is no pocket behind it. Nevertheless, the intended second limiting stop is achieved by means of the opening 50 if the thickness of the material of the metal sheet of which the bearing shell 90 is composed is such that the projection 53 formed on the bearing cage 36 extends only into this opening 50 and not into the material of the lever 1. In this case, the stop edge 52 is formed by the transition between the edge of the opening 50 and the curvature plane E of the race defined by the outer side of the bearing shell 90.

LIST OF REFERENCE SIGNS 1 lever
1A pivot arm
2 rolling bearing, pivot bearing
6 internal thread
7 pressure piece
8A section of the brake application shaft
8B section of the brake application shaft
9 free space
11 pressure surface
12 pressure surface
32 bearing shell
34 projection, stop
35 race
36 bearing cage
37 rolling element
37A circumferential surface of rolling element
39 outer side
45 race
50 pocket or opening
52 stop edge
53 projection
60 anchoring pin
61 anchor
62 bore
71 side wall
72 side wall
73 longitudinal edge
74 projection
75 retention element
76 resilient section
77 locking projection
78 stop edge
79 nose
80 slotted hole
81 stop
82 stop
83 projection
86 stop
87 end of slotted hole
90 bearing shell
91 bent portion, fastening tab
E curvature plane
F force
M axis of rotation
M1 axis of rotation

The invention claimed is:

1. A bearing of a lever (1), which is provided with a pivot arm (1A), in relation to a pressure piece (7), the bearing having
    a first race (45) on the lever side, wherein said first race is curved in a partially cylindrical manner;
    a second race (35) on the pressure-piece side, wherein said second race is curved in a partially cylindrical manner;
    rolling elements (37), which roll on both the first and second races (45, 35) and are grouped together in a bearing cage (36); and
    a radial projection (34), which is fixed in terms of rotation relative to the second race (35) and forms a stop which limits the mobility of the bearing cage (36) in one circumferential direction;
characterized by a pocket (50) or opening, which is arranged in the first race (45) or extends partially into said first race, said pocket or opening extending only over a part of a width of the first race and, at the transition to the curvature plane (E) of the first race (45), forming a stop edge (52) which limits the mobility of the bearing cage (36) in the other circumferential direction.

2. The bearing as claimed in claim 1, characterized in that the first race (45) is provided with the pocket (50) or opening on a section of the circumference remote from the pivot arm (1A).

3. The bearing as claimed in claim 1, characterized in that the pocket (50) or opening is arranged in the center of the width of the first race.

4. The bearing as claimed in claim 1, characterized in that the width of the pocket (50) or opening amounts to no more than one third of the width of the first race.

5. The bearing as claimed in claim 1, characterized in that, opposite the stop edge (52) in the circumferential direction, the bearing cage (36) is provided with a projection (53) which projects into the pocket (50) or opening.

6. The bearing as claimed in claim 5, characterized in that the projection (53) is formed integrally on the bearing cage (36).

7. The bearing as claimed in claim 5, characterized in that the length of the projection (53) in the circumferential direction is less than the length of the pocket (50) or opening.

8. The bearing as claimed in claim 5, characterized in that the width of the projection (53) is less than the width of the pocket (50) or opening.

9. The bearing as claimed in claim 1, characterized in that the second race (35) is formed on a bearing shell (32), on which the radial projection (34) is formed.

10. The bearing as claimed in claim 9, characterized in that the bearing shell (32) has an outward-projecting anchoring pin (60) to secure the bearing shell (32) on the pressure piece (7), said outward-projecting anchoring pin (60) being anchored in the pressure piece (7).

11. The bearing as claimed in claim 1, characterized in that the pocket (50) or opening is situated in the first race (45) on the lever side.

12. The bearing as claimed in claim 1, characterized in that the lever (1), including the pivot arm (1A), is a forged component, and in that the pocket (50) is the result of the forging process.

* * * * *